March 21, 1939.    F. L. COOK    2,151,268
CHAIN PIPE WRENCH
Filed Sept. 15, 1937
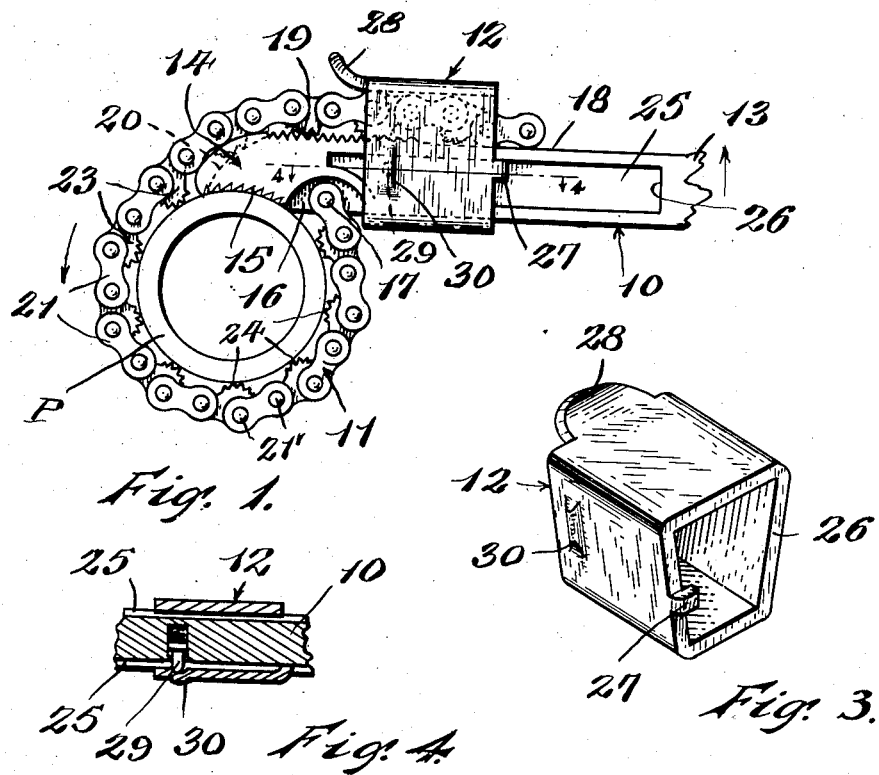
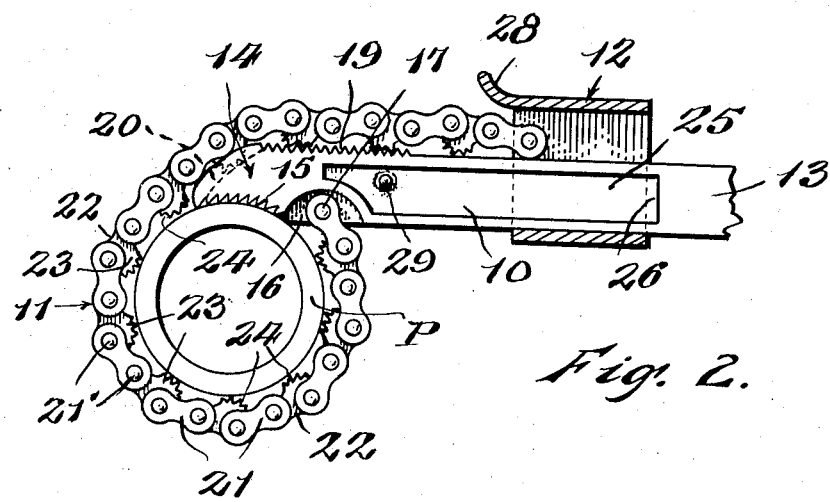
INVENTOR.
Frank L. Cook,
BY: Christian R. Nielsen
ATTORNEY.

Patented Mar. 21, 1939

2,151,268

UNITED STATES PATENT OFFICE 2,151,268

CHAIN PIPE WRENCH

Frank L. Cook, South Bend, Ind.

Application September 15, 1937, Serial No. 164,073

2 Claims. (Cl. 81—68)

This invention relates to wrenches and more particularly to a chain wrench and it consists in the constructions, arrangements and combinations herein described and claimed.

It is a cardinal object of the invention to provide a novel construction of retaining means for detachably connecting the loose or free end of the chain to the wrench handle.

It is also an object of the invention to provide a detent means for holding the chain-retaining means in its operative position upon the chain.

It is also an object of the invention to provide a retaining means which embodies a member engageable with the handle preventing accidental removal from the handle.

Additional objects, advantages and features of invention will be apparent from the following description and accompanying drawing, wherein—

Figure 1 is a side elevation of a wrench constructed in accordance with my invention, a portion of the handle being broken away.

Figure 2 is a similar view showing the retainer member in section.

Figure 3 is an enlarged perspective view of the retainer member.

Figure 4 is a cross section on the line 4—4 of Figure 1.

There is illustrated an operating lever 10 having attached adjacent its forward end, one end of a grip chain 11, the free end of the chain being detachably connected with the handle by the retainer member 12.

The operating lever 10 comprises a handle portion 13 and a head 14, the latter being provided upon its underside with an arcuately concaved serrated jaw face 15, the teeth of which extend transversely of the head. To the rear of the jaw 15, the head is formed to provide a web 16, which is accomplished by cutting out portions at each side of the head, and this web serves for anchorage of the chain which may be effected through a coupling pin 17. The upper edge 18 of the head 14 is provided with a series of transversely extending teeth 19 forming a rack extending longitudinally of the head at the retaining member 12. The forward end of the jaw 15 is rounded off and provided with a groove 20 extending from the forward end of the teeth 19 to the forward end of the concaved jaw 15.

The chain 11 is constructed of a series of coupling link plates 21 pivotally connecting as by the coupling pins 21', a series of grip links 22, the grip links 22 being arranged between pairs of the coupling links 21.

The grip links 22, considering the direction of gripping action of the chain about the pipe P as in the direction of the arrow shown in Figure 1, are each provided at their forward ends with an inwardly projecting grip portion or cam projection 23 provided with transversely extended teeth providing a cam face 24 for gripping engagement with the circumferential face of the pipe. The teeth of the cam faces 24 extend transversely of the grip links and are preferably V or saw-toothed to conform with the teeth 19 provided along the head 14. This arrangement is to permit slight rocking movement of the grip links having connection with the head 14, as well as the grip links contacting the pipe P. When a pull is exerted upwardly upon the handle 13 in the direction of the arrow in Figure 1, the grip links contacting the pipe will have a slight longitudinal rocking movement imparted thereto and this rocking movement alters the position of the axes of the coupling pins 21' with respect to the surface of the pipe.

Attention is now directed to the retainer member 12 for releasably connecting the loose or free end of the chain 11. The lever 10 has a recess 25 in the sides, extending longitudinally thereof, stopping short of the handle 13 forming shoulders 26, for a purpose as will presently appear.

The retainer member 12 in the present instance, is shown as a rectangular collar 26, of a width slidably receiving the lever 10 therethrough, and a rear vertical edge of the collar has formed integrally therewith a lug 27 extended inwardly in a direction to lie within the channel 25 and of a length to engage the shoulders 26 in the longitudinal sliding movement of the collar. The upper forward edge of the collar is upwardly turned as at 28, forming a finger-rest, facilitating sliding movement of the collar.

Within the channel 26 at the forward end thereof a spring-pressed plunger 29 is mounted cooperable with a recess 30 formed in the adjacent wall of the collar.

In use, the collar 12 is slid rearwardly upon the lever 10, so as to clear the teeth 19. The chain 11 is then drawn around the pipe, the free end and a portion rearwardly thereof lying upon the upper edge of the lever 10, with teeth of certain of the cam faces 24 engaged with teeth 19. With the chain thus engaged, the collar 26 is slid forwardly over the chain as clearly shown in Figure 1, until the plunger 29 comes to rest in the recess 30. With the chain thus secured about the pipe, when an upward pull is exerted upon the handle, the chain will be drawn in the direction of the arrow as shown in Figure 1. This direction of pull upon the chain causes the grip links 22 to be rocked longitudinally through engagement of the cam faces 23 with the pipe surface and this rocking movement causes the rear end of the grip links to move away from the pipe surface and this action is also true with respect to the upper edge 18 of the lever, and therefore as the chain is drawn taut the rear ends of the grip links beneath the collar will tend to swing upwardly until engaged by the underface of the top wall thereof, but since the clearance between the top side of the chain and the underface of the top wall of the collar is not sufficient to permit the teeth of the cams 24 to disengage the teeth 19, the chain will be firmly secured. In order to remove the chain from a pipe, it is only necessary to exert a rearward movement upon the collar so as to disengage the plunger from the recess.

While I have shown a preferred form of the invention, this is by way of illustration only, and I consider as my own all such variations in structure as fairly fall within the scope of the appended claims.

I claim:

1. A chain wrench comprising a lever having a head at one end thereof, a link chain connected to the head, the upper face of the head having teeth thereon, teeth on the links of the chain cooperable with the first named teeth when the chain extends longitudinally of the upper face, a channel formed in the sides of the head and terminating in vertically disposed shoulders, a slidable collar on the head of a size to snugly receive the chain therethrough for maintaining the teeth in engagement and said collar having a lug disposed within the channel.

2. A chain wrench comprising a lever having a head at one end thereof, a link chain connected to the head, the upper face of the head having teeth thereon, teeth on the links of the chain cooperable with the first named teeth when the chain extends longitudinally of the upper face, a channel formed in the sides of the head and terminating in vertically disposed shoulders, a slidable collar on the head of a size to snugly receive the chain therethrough for maintaining the teeth in engagement, said collar having a lug disposed within the channel, a spring-pressed plunger in the head, and said collar having a recess complemental to the plunger.

FRANK L. COOK.